United States Patent
Long et al.

(10) Patent No.: US 9,972,944 B1
(45) Date of Patent: May 15, 2018

(54) PLUGGABLE MODULE HAVING A SEAM COVER

(71) Applicant: TE CONNECTIVITY CORPORATION, Berwyn, PA (US)

(72) Inventors: Richard James Long, Columbia, PA (US); Steven David Dunwoody, Middletown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days. days.

(21) Appl. No.: 15/807,703

(22) Filed: Nov. 9, 2017

(51) Int. Cl.
    G02B 6/42        (2006.01)
    H01R 13/6581     (2011.01)
    H01R 24/30       (2011.01)
    H01R 13/6594     (2011.01)
    H01R 12/71       (2011.01)

(52) U.S. Cl.
    CPC ....... *H01R 13/6581* (2013.01); *G02B 6/4277* (2013.01); *G02B 6/4292* (2013.01); *H01R 24/30* (2013.01); *H01R 12/716* (2013.01); *H01R 13/6594* (2013.01)

(58) Field of Classification Search
    CPC ............... H01R 13/6581; H01R 24/30; H01R 13/6594; H01R 12/716; G02B 6/4292; G02B 6/4277
    See application file for complete search history.

(56) References Cited

U.S. PATENT DOCUMENTS

| 6,843,679 B2 | 1/2005 | Kuo et al. |
| 6,891,735 B2 | 5/2005 | Hultermans et al. |
| 7,195,404 B1 * | 3/2007 | Dudley ................ G02B 6/4201 385/92 |
| 7,290,945 B2 * | 11/2007 | Ahrens ................ G02B 6/4201 385/101 |
| 7,358,447 B2 | 4/2008 | Gabower |

* cited by examiner

*Primary Examiner* — John M Bedtelyon

(57) ABSTRACT

A pluggable module includes a pluggable body extending between a front end and a mating end receivable in a module cavity of a receptacle assembly to mate with a communication connector. The pluggable body has a top, a bottom, a first side wall and a second side wall between the top and the bottom and has an upper shell defining the top and a lower shell defining the bottom coupled together at a seam. A seam cover is coupled to the pluggable body at the first side wall covering the seam between the upper shell and the lower shell on the first side wall. The seam cover is conductive and provides EMI shielding at the seam for a communication circuit board held in the pluggable body.

20 Claims, 3 Drawing Sheets

PLUGGABLE MODULE HAVING A SEAM COVER

BACKGROUND OF THE INVENTION

The subject matter herein relates generally to pluggable modules.

At least some known communication systems include receptacle assemblies, such as input/output (I/O) connector assemblies, that are configured to receive a pluggable module and establish a communicative connection between the pluggable module and an electrical communication connector of the receptacle assembly. As one example, a known receptacle assembly includes a cage member that is mounted to a circuit board and configured to receive a pluggable transceiver in an elongated cavity of the cage member. The pluggable module and the electrical connector have respective electrical contacts that engage one another to establish a communicative connection.

Electrical shielding of the components of the communication system is typically provided to prevent signal interference. For example, electrical shielding is provided using a receptacle housing or cage that provides shielding around the module cavity that receives the pluggable module. Gaskets are provided in the opening to interface with the pluggable module. Such shielding provides shielding around the outside of the pluggable module but the pluggable module is still susceptible to EMI leakage through unshielded portions of the pluggable module itself. For example, EMI leakage may occur at the seam between the upper shell and the lower shell of the body of the pluggable module.

Accordingly, there is a need for a pluggable module having sufficient EMI shielding.

BRIEF DESCRIPTION OF THE INVENTION

In one embodiment, a pluggable module is provided including a pluggable body extending between a front end and a mating end receivable in a module cavity of a receptacle assembly to mate with a communication connector. The pluggable body has a top, a bottom, a first side wall and a second side wall between the top and the bottom and has an upper shell defining the top and a lower shell defining the bottom coupled together at a seam. A communication circuit board is held in the pluggable body and exposed at the mating end where the pluggable body is configured to be plugged into the receptacle assembly such that the communication circuit board is communicatively coupled to the communication connector of the receptacle assembly. A seam cover is coupled to the pluggable body at the first side wall covering the seam between the upper shell and the lower shell on the first side wall. The seam cover is conductive and provides EMI shielding at the seam for the communication circuit board.

In another embodiment, a pluggable module is provided including a pluggable body extending between a front end and a mating end receivable in a module cavity of a receptacle assembly to mate with a communication connector. The pluggable body has a top, a bottom, a first side wall and a second side wall between the top and the bottom and has an upper shell defining the top and a lower shell defining the bottom coupled together at a seam. The upper shell has an upper pocket in the upper shell along the first side wall and the lower shell having a lower pocket in the lower shell along the first side wall aligned with the upper pocket. A communication circuit board is held in the pluggable body and exposed at the mating end where the pluggable body is configured to be plugged into the receptacle assembly such that the communication circuit board is communicatively coupled to the communication connector of the receptacle assembly. A seam cover is received in the upper pocket and the lower pocket and spanning across the seam between the upper shell and the lower shell on the first side wall. The seam cover is conductive and provides EMI shielding at the seam for the communication circuit board.

In a further embodiment, a pluggable module is provided including a pluggable body extending between a front end and a mating end receivable in a module cavity of a receptacle assembly to mate with a communication connector. The pluggable body has a top, a bottom, a first side wall and a second side wall between the top and the bottom and has an upper shell defining the top and a lower shell defining the bottom coupled together at a seam. A communication circuit board is held in the pluggable body and exposed at the mating end where the pluggable body is configured to be plugged into the receptacle assembly such that the communication circuit board is communicatively coupled to the communication connector of the receptacle assembly. A seam cover is coupled to the pluggable body at the first side wall covering the seam between the upper shell and the lower shell on the first side wall. The seam cover includes a conductive tape having a conductive layer and an adhesive layer applied to the upper shell and the lower shell to span the seam. The conductive layer provides EMI shielding at the seam for the communication circuit board.

DETAILED DESCRIPTION OF THE INVENTION

Figure 1:
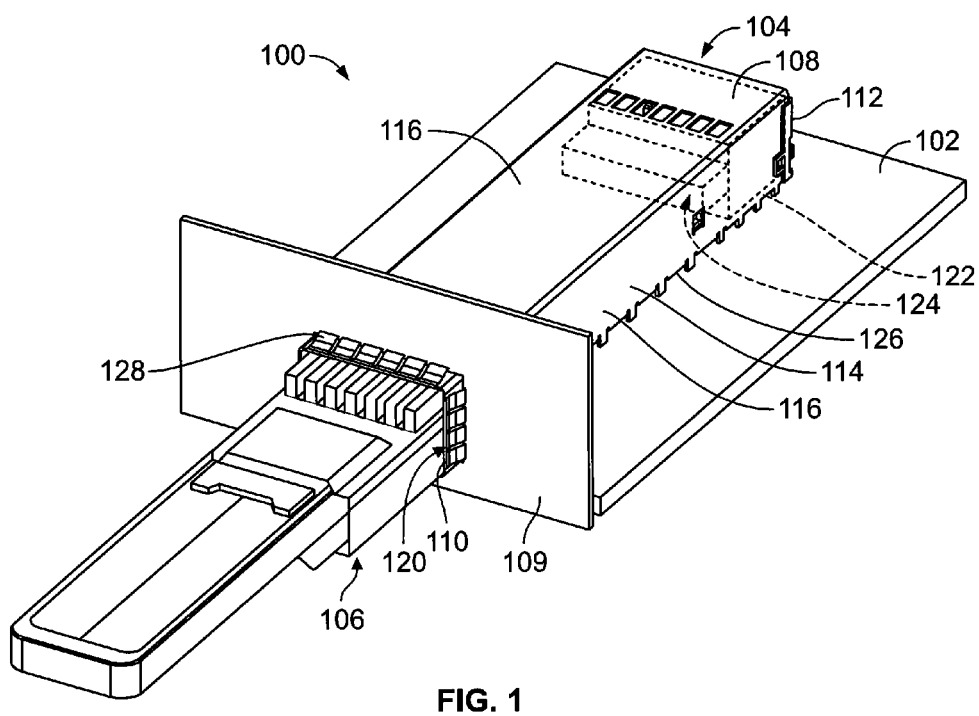
FIG. 1 is a front perspective view of a communication system in accordance with an embodiment.

FIG. 1 is a front perspective view of a communication system 100 in accordance with an embodiment. The communication system 100 includes a circuit board 102, a receptacle assembly 104 mounted to the circuit board 102, and a pluggable module 106 that is configured to be received in the receptacle assembly 104. The circuit board 102 may be a daughter card or a mother board and include conductive traces (not shown) extending therethrough. Optionally, the pluggable module 106 may be communicatively coupled to the receptacle assembly 104, such as to a communication connector, to send and/or receive data signals with components of the communication system 100.

The communication system 100 may be part of or used with telecommunication systems or devices. For example, the communication system 100 may be part of or include a switch, router, server, hub, network interface card, or storage system. In the illustrated embodiment, the pluggable module 106 is configured to transmit data signals in the form of electrical signals. In other embodiments, the pluggable module 106 may be configured to transmit data signals in the form of optical signals. The circuit board 102 may be a daughter card or a mother board and include conductive traces (not shown) extending therethrough.

In the illustrated embodiment, the receptacle assembly 104 is illustrated as a single port receptacle assembly configured to receive a single pluggable module 106; however, the receptacle assembly 104 may be a multi-port receptacle assembly in other embodiments configured to receive pluggable modules 106 in multiple ports. For example, the multiple ports of the receptacle assembly 104 may be ganged side-by-side and/or stacked in addition to, or alternative to, ganged ports.

The pluggable module 106 is an input/output (I/O) module configured to be inserted into and removed from the receptacle assembly 104. For example, the pluggable module 106 may be a small form-factor pluggable (SFP) transceiver or quad small form-factor pluggable (QSFP) transceiver, such as those satisfying certain technical specifications for SFP or QSFP transceivers, such as Small-Form Factor (SFF)-8431. By way of example, the pluggable module 106 may be used in place of transceivers which are part of the SFP+ product family available from TE Connectivity.

The receptacle assembly 104 includes a cage member 108 that is mounted to the circuit board 102. The cage member 108 may be arranged at a bezel or panel 109 of a chassis of the system or device, such as through an opening in the panel 109. As such, the cage member 108 is interior of the device and corresponding panel 109 and the pluggable module(s) 106 is loaded into the cage member 108 from outside or exterior of the device and corresponding panel 109. Optionally, the panel 109 may include a plurality of openings each configured to receive a corresponding pluggable module 106. In other various embodiments, the opening in the panel 109 may be sized to receive multiple pluggable modules 106, such as when a multi-port receptacle assembly 104 is used.

The cage member 108 includes a front end 110 and an opposite rear end 112. The front end 110 may be provided at, and extend through an opening in, the panel 109. Relative or spatial terms such as "front," "rear," "top," or "bottom" are only used to distinguish the referenced elements and do not necessarily require particular positions or orientations in the communication system 100 or in the surrounding environment of the communication system 100. For example, the front end 110 may be located in or facing a back portion of a larger telecommunication system. In many applications, the front end 110 is viewable to a user when the user is inserting the pluggable module 106 into the receptacle assembly 104. The pluggable module 106 is accessible to the user and viewable to the user when the pluggable module 106 is inserted into the receptacle assembly 104.

The cage member 108 is configured to contain or block interference, such as electromagnetic interference (EMI), and guide the pluggable module(s) 106 during a mating operation. To this end, the cage member 108 includes multiple pieces assembled together to enclose the pluggable module 106. For example, the pieces may be snap-fit together and/or welded together. When the cage member 108 is mounted to the circuit board 102, the cage member 108 is electrically coupled to the circuit board 102 and, in particular, to ground planes (not shown) within the circuit board 102 to electrically ground the cage member 108. As such, the receptacle assembly 104 may reduce EMI that may negatively affect electrical performance of the communication system 100. The pluggable module 106 may be electrically commoned with or grounded to the cage member 108, such as for EMI containment and/or shielding. For example, the pluggable module 106 may directly engage a portion of the cage member 108, such as an EMI gasket at the opening to the cage member 108.

In an exemplary embodiment, the cage member 108 includes a receptacle housing 114 defined by a plurality of housing panels or walls 116, which may be formed from one or more pieces. The various walls 116 provide shielding for vulnerable areas of other components, such as by covering or shielding openings in walls of the other components. The receptacle housing 114 extends between the front end 110 and the rear end 112. The walls 116 are formed from conductive material, such as sheet metal and/or a polymer having conductive particles. In the illustrated embodiment, the pieces are stamped and formed from sheet metal. In some embodiments, the cage member 108 is configured to facilitate airflow through the cage member 108 to transfer heat (or thermal energy) away from the receptacle assembly 104 and the pluggable module(s) 106. The air may flow from inside the cage member 108 (for example, behind the panel 109) to the external environment (for example, forward of the panel 109) or from outside the cage member 108 into the interior of the cage member 108. Fans or other air moving devices may be used to increase airflow through the cage member 108 and over the pluggable module(s) 106.

The receptacle housing 114 defines a module cavity 120 extending between the front and rear ends 110, 112. The module cavity 120 receives the pluggable module 106. The module cavity 120 extends lengthwise in a direction that is parallel to the plugging axis of the pluggable module 106. For a multi-port receptacle assembly 104, multiple module cavities 120 or ports are defined for receiving multiple pluggable modules 106. In such embodiments, the module cavities 120 may be stacked vertically and/or ganged horizontally. Separator panels may be provided between the module cavities 120 to provide shielding between the module cavities 120.

The receptacle assembly 104 includes a communication connector 122 (shown in phantom in FIG. 1) having a mating interface 124 for mating with the pluggable module 106. The communication connector 122 may have multiple mating interfaces when configured to mate with multiple pluggable modules 106, such as when used in a stacked cage member. The communication connector 122 is disposed at the rear end of the module cavity 120. In an exemplary embodiment, the communication connector 122 is provided at or near the rear end 112 of the cage member 108. The communication connector 122 includes electrical contacts (not shown) that are configured to be mated with the pluggable module 106. The communication connector 122 is configured to be mounted to the circuit board 102. The communication connector 122 is configured to be received in the cage member 108 through a bottom 126 of the cage member 108. For example, the cage member 108 is configured to be mounted to the circuit board 102 over the communication connector 122 such that the communication connector 122 passes through an opening in the bottom 126 as the cage member 108 is mounted to the circuit board 102.

In an exemplary embodiment, the receptacle assembly 104 includes an EMI gasket 128 at the front end 110 of the receptacle housing 114. The EMI gasket 128 interfaces with the panel 109, such as within the opening in the panel 109 that receives the receptacle assembly 104. The EMI gasket 128 may be one or more separate pieces, which may be attached to the receptacle housing 114, such as by clipping onto the receptacle housing 114, welding to the receptacle housing 114 or otherwise being secured to the receptacle housing 114. In other various embodiments, the EMI gasket 128 may be integral with the receptacle housing 114, such as being stamped and formed out of or extending from the walls 116 of the receptacle housing 114. The EMI gasket 128 may extend into the module cavity 120 to engage the pluggable module 106.

Figure 2:
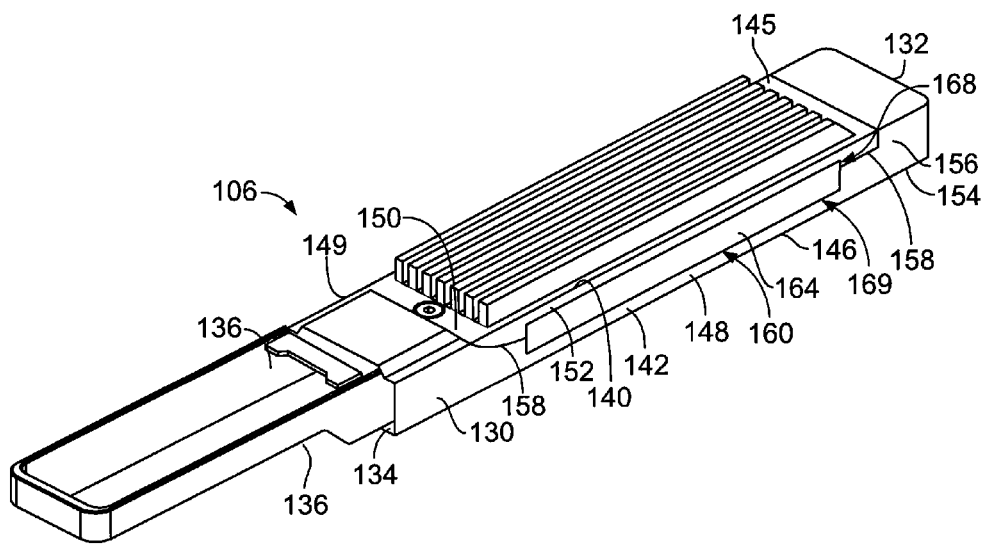
FIG. 2 is a front perspective view of a pluggable module of the communication system in accordance with an exemplary embodiment.
Figure 3:
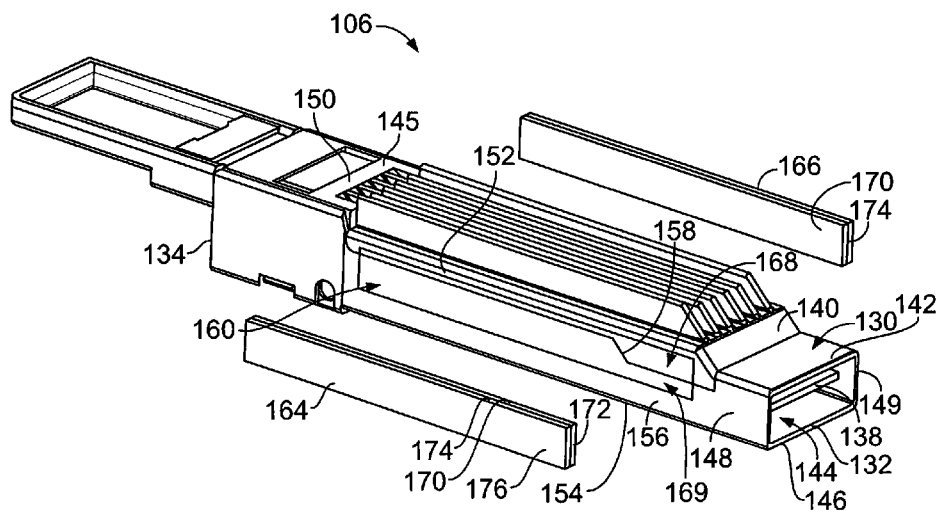
FIG. 3 is a rear perspective view of the pluggable module in accordance with an exemplary embodiment.
Figure 4:
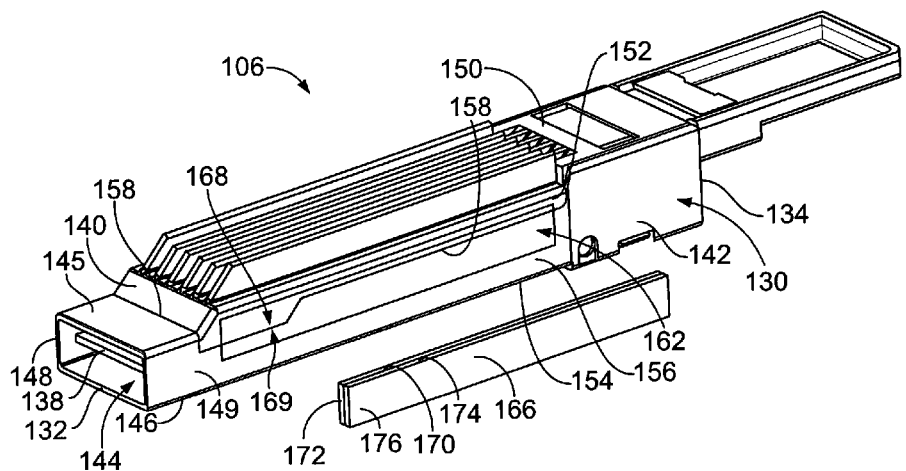
FIG. 4 is a rear perspective view of the pluggable module in accordance with an exemplary embodiment.

FIG. 2 is a front perspective view of the pluggable module 106 in accordance with an exemplary embodiment. FIG. 3 is a rear perspective view of the pluggable module 106 in accordance with an exemplary embodiment. FIG. 4 is another rear perspective view of the pluggable module 106 in accordance with an exemplary embodiment. The pluggable module 106 has a pluggable body 130, which may be defined by one or more shells. For example, in the illustrated embodiment, the pluggable body 130 includes an upper shell 140 and a lower shell 142. The pluggable body 130 may be thermally conductive and/or may be electrically conductive, such as to provide EMI shielding for the pluggable module 106. The pluggable body 130 includes a rear end or mating end 132 and an opposite front end 134. The mating end 132 is configured to be inserted into the module cavity 120 (shown in FIG. 1) for mating with the communication connector 122 (shown in FIG. 1). The front end 134 is typically a cable end having one or more cables 136 extending to another component within the system. The front end 134 is exposed forward of the panel 109 from the exterior of the receptacle assembly 104.

The pluggable body 130 includes a communication circuit board 138 held within the pluggable body 130, such as in a cavity 144 defined by the upper and lower shells 140, 142. The communication circuit board 138 is configured to be communicatively coupled to the communication connector 122 (shown in FIG. 1). The communication circuit board 138 may be accessible or exposed at the mating end 132. The cables 136 are terminated to the communication circuit board 138, such as directly or through a connector on the communication circuit board 138. The cables 136 may be copper wires transmitting electrical signals or may be fiber optic cables transmitting optical signals. The communication circuit board 138 has communication components (not shown) connected thereto for transmitting the signals between the cables 136 and the mating end of the communication circuit board 138. For example, the communication circuit board 138 may have conductors, traces, pads, electronics, optical modules, sensors, controllers, switches, inputs, outputs, and the like associated with the communication circuit board 138, which may be mounted to the communication circuit board 138, to form circuits and to control operation of the pluggable module 106.

The pluggable module 106 includes an outer perimeter defining an exterior of the pluggable body 130. The exterior extends between the mating end 132 and the front end 134 of the pluggable module 106. The exterior is defined by one or more surfaces of the pluggable body 130. For example, the exterior may be defined by a top 145, a bottom 146 and opposite first and second side walls 148, 149 of the pluggable body 130.

In an exemplary embodiment, the pluggable body 130 provides heat transfer for the communication circuit board 138, such as for the electronic components on the communication circuit board 138. For example, the communication circuit board 138 is in thermal communication with the pluggable body 130 and the pluggable body 130 transfers heat from the communication circuit board 138.

The upper and lower shells 140, 142 are coupled together to form the pluggable body 130. The upper shell 140 has an upper wall 150 and upper side walls 152 and the lower shell 142 has a lower wall 154 and lower side walls 156. The lower wall 154, the upper wall 150, the lower side walls 156 and the upper side walls 152 form the cavity 144. The side walls 152, 156 may be coupled together to form the pluggable body 130. For example, the side walls 152, 156 may meet at a seam 158 around the exterior. The side walls 152, 156 may have similar heights such that the seam 158 is approximately centered between the top 145 and the bottom 146. In an exemplary embodiment, the upper shell 140 and the lower shell 142 are die cast components manufactured from metal materials using dies or tools to cast the parts; however, the shells 140, 142 may be manufactured by other processes in alternative embodiments, such as molding, milling, machining, extruding, stamping, forming, and the like.

In an exemplary embodiment, the first and second side walls 148, 149 have pockets 160, 162, respectively. The pockets 160, 162 receive corresponding first and second seam covers 164, 166. FIG. 3 illustrates the first and second seam covers 164, 166 exploded from the pluggable body 130 and poised for mounting to the pluggable body 130. FIG. 4 illustrates the second seam cover 166 exploded from the pluggable body 130 and poised for mounting to the pluggable body 130. The seam covers 164, 166 cover portions of the seam 158 to provide EMI shielding for the seam 158. The seam covers 164, 166 are conductive and span across the seam 158. For example, an upper portion of each seam cover 164, 166 extends along the upper side walls 152 and a lower portion of each seam cover 164, 166 extends along the lower side walls 156. In an exemplary embodiment, the upper shell 140 includes upper pockets 168 along the side walls 148, 149 and the lower shell 142 includes lower pockets 169 along the side walls 148, 149 aligned with the upper pocket 168. The seam covers 164, 166 are received in the upper pockets 168 and the lower pockets 169 and span across the seam 158 between the upper shell 140 and the lower shell 142. Optionally, the pockets 160, 162 are deep enough such that the seam covers 164, 166 are flush with or recessed inward from the outer perimeter of the pluggable body 130 so as to not increase the width of the pluggable body 130. In alternative embodiments, the pluggable body 130 is provided without the pockets 160, 162, but rather the seam covers 164, 166 are attached to the outer perimeter of the pluggable body 130 and protrude outward from the outer perimeter.

In an exemplary embodiment, the seam covers 164, 166 are separate components from the pluggable body 130 (for example, manufactured separately) and coupled thereto. The seam covers 164, 166 may be secured to the pluggable body 130 by adhesive. In other various embodiments, the seam covers 164, 166 may be secured by other means, such as by welding, soldering, using fasteners, and the like. In an exemplary embodiment, the seam covers 164, 166 are conductive tapes having an adhesive layer 170 at an interior surface 172 thereof and a conductive layer 174 at an exterior surface 176 thereof. The interior surface 172 may face the pluggable body 130. Optionally, the interior surface 172 may directly engage the corresponding side wall 148, 149 and may be electrically connected to the side wall 148, 149.

In other various embodiments, the seam covers 164, 166 are a conductive foil, a conductive mesh, or another type of thin, planar conductive structure. In alternative embodiments, rather than being a pre-shaped structure, the seam covers 164, 166 may be a coating layer applied to the pluggable body 130, such as in the pockets 160, 162. For example, the seam covers 164, 166 may be a conductive gel or epoxy applied to the pluggable body 130 over the seam 158. In other various embodiments, the seam covers 164, 166 may be solder or weld material applied over the seam 158. Optionally, the seam covers 164, 166 may change at least one physical characteristic after application. For example, the seam covers 164, 166 may be applied and then cure. The seam covers 164, 166 may be applied and then harden. The seam covers 164, 166 may be applied and then transform state, such as from liquid to solid. The seam covers 164, 166 may be changed by application of heat, chemical reactants, ultraviolet light, and the like.

In an exemplary embodiment, the seam covers 164, 166 cover a significant portion of the seam 158 along the side walls 148, 149. For example, the seam covers 164, 166 may cover a majority of the seam 158 along the side walls 148,149. The seam covers 164, 166 may cover a majority of the entire seam 158, such as along the top, at the rear end, and the like. Optionally, seam covers may be applied to other portions of the pluggable body 130 in addition to the side walls 148, 149. In the illustrated embodiment, the seam covers 164, 166 are long continuous strips with one seam cover 164, 166 at each side wall 148, 149. However, in alternative embodiments, multiple seam covers 164 may be provided at the first side wall 148 and/or multiple seam covers 166 may be provided at the second side wall 149. The multiple seam covers 164, 166 may overlap adjacent sections. Alternatively, the seam covers 164, 166 may be separated from each other with short sections of the seam 158 exposed therebetween. For example, the side walls 148, 149 may include multiple pockets 160, 162 receiving corresponding seam covers 164, 166; however the side walls 148, 149 may be thicker between the pockets 160, 162 to add structural strength and rigidity to the side walls 148, 149.

Figure 5:
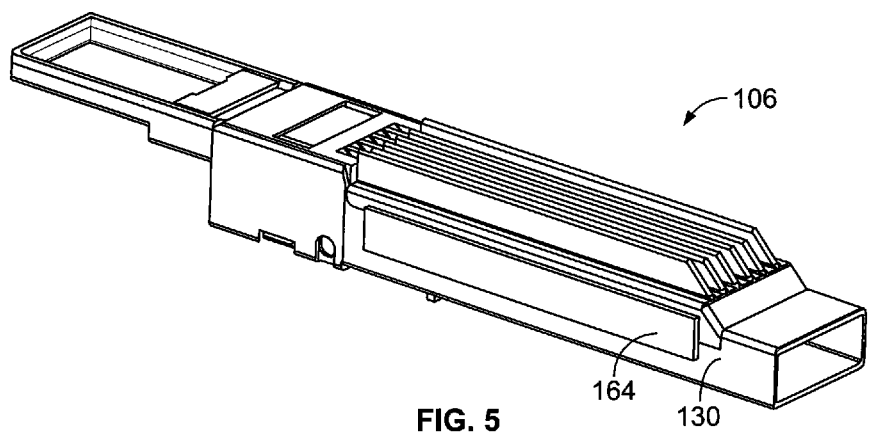
FIG. 5 is a perspective view of the pluggable module in accordance with an exemplary embodiment.

FIG. 5 is a perspective view of the pluggable module 106 in accordance with an exemplary embodiment. The pluggable module 106 is similar to the embodiment shown in FIGS. 2-4; however, in the illustrated embodiment, the pluggable module 106 does not include the pockets 160, 162 (shown in FIGS. 3 and 4). The seam covers 164, 166 (shown in FIGS. 3 and 4) are applied to the outer perimeter of the pluggable body 130 and protrude from the outer perimeter of the pluggable body 130.

Figure 6:
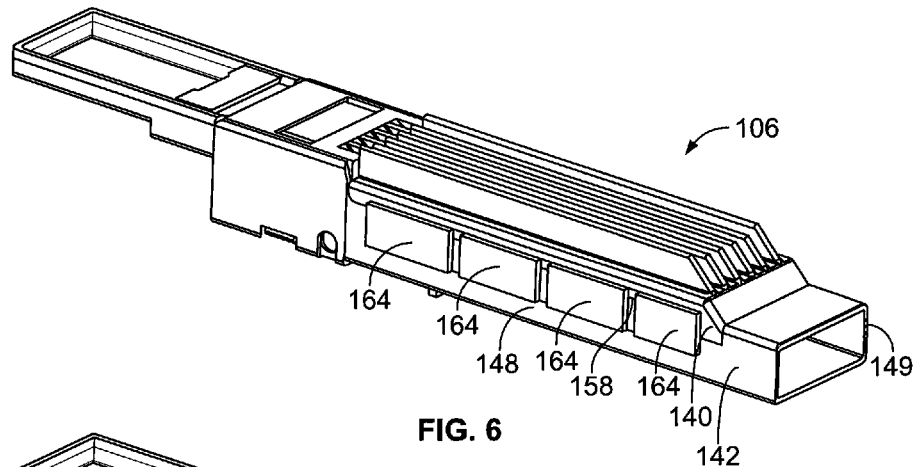
FIG. 6 is a perspective view of the pluggable module in accordance with an exemplary embodiment.

FIG. 6 is a perspective view of the pluggable module 106 in accordance with an exemplary embodiment. The pluggable module 106 is similar to the embodiment shown in FIGS. 2-4; however, in the illustrated embodiment, the pluggable module 106 includes multiple seam covers 164 and multiple seam covers 166 (shown in FIGS. 3 and 4). The seam covers 164 do not overlap in the illustrated embodiment; however, the seam covers 164 may overlap in alternative embodiments. Portions of the seams 158 are exposed between the seam covers 164; however, such portions may be relatively short to limit the chance of or amount of EMI leakage through such exposed portions. Portions of the upper shell 140 and the lower shell 142 extend between the seam covers 164 to increase the strength and rigidity of the side walls 148, 149.

Figure 7:
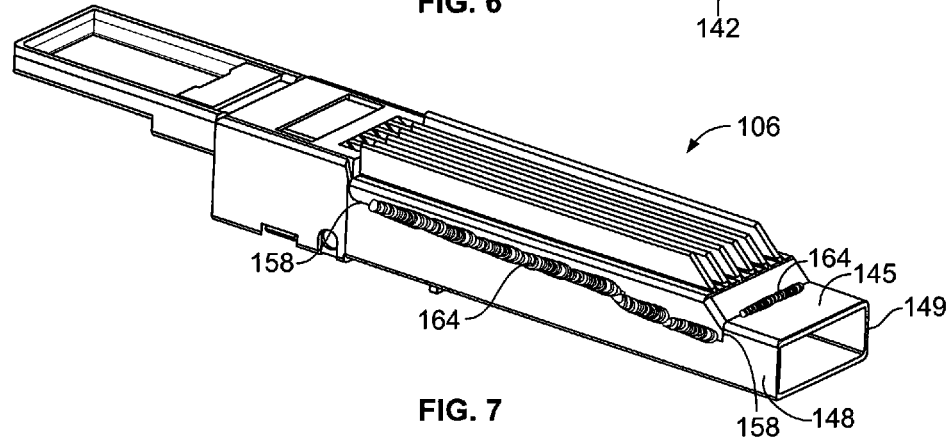
FIG. 7 is a perspective view of the pluggable module in accordance with an exemplary embodiment.

FIG. 7 is a perspective view of the pluggable module 106 in accordance with an exemplary embodiment. The pluggable module 106 is similar to the embodiment shown in FIGS. 2-4; however, in the illustrated embodiment, the seam covers 164 are coating layers applied directly to the pluggable body 130 at the seam 158. For example, the coating layers may be conductive epoxy, welding material, and the like. The seam covers 164 may be applied across the top 145 in addition to the side walls 148, 149.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A pluggable module comprising:
   a pluggable body extending between a front end and a mating end, the mating end being receivable in a module cavity of a receptacle assembly to mate with a communication connector, the pluggable body having a top, a bottom, a first side wall and a second side wall between the top and the bottom, the pluggable body having an upper shell defining the top and a lower shell defining the bottom, the upper shell being coupled to the lower shell at a seam, the pluggable body includes a pocket in the first side wall;
   a communication circuit board held in the pluggable body and exposed at the mating end, wherein the pluggable body is configured to be plugged into the receptacle assembly such that the communication circuit board is communicatively coupled to the communication connector of the receptacle assembly; and
   a seam cover coupled to the pluggable body and received in the pocket at the first side wall, the seam cover covering the seam between the upper shell and the lower shell on the first side wall, the seam cover being conductive and providing EMI shielding at the seam for the communication circuit board.

2. The pluggable module of claim 1, wherein the seam cover comprises a conductive tape spanning the seam.

3. The pluggable module of claim 1, wherein the seam cover includes an interior surface facing the pluggable body, the interior surface directly engaging the first side wall and being electrically connected to the first side wall.

4. The pluggable module of claim 1, wherein the seam cover has a seam cover length, the seam along the first side wall having a seam length, the seam cover length being at least half the seam length.

5. The pluggable module of claim 1, wherein a majority of the seam is covered by the seam cover.

6. The pluggable module of claim 1, wherein the pluggable body includes a second pocket in the second side wall, a second seam cover being received in the second pocket.

7. The pluggable module of claim 1, wherein the upper shell includes an upper pocket along the first side wall and the lower shell includes a lower pocket along the first side wall aligned with the upper pocket, the seam cover being received in the upper pocket and the lower pocket and spanning across the seam between the upper shell and the lower shell on the first side wall.

8. The pluggable module of claim 1, wherein the seam cover includes an interior surface facing the pluggable body and an opposite exterior surface, the exterior surface being flush with or recessed inward of the first side wall.

9. The pluggable module of claim 1, further comprising a second seam cover on the second side wall covering at least a portion of the seam at the second side wall.

10. The pluggable module of claim 1, wherein the seam cover is a first seam cover, the pluggable module further comprising at least a second seam cover coupled to the pluggable body at the first side wall separated from the first seam cover with a portion of the seam exposed between the first seam cover and the second seam cover.

11. The pluggable module of claim 1, wherein the seam cover includes a conductive layer and an adhesive layer, the adhesive layer being applied to the upper shell and the lower shell to secure the seam cover to the upper shell and the lower shell, the conductive layer providing EMI shielding at the seam for the communication circuit board.

12. The pluggable module of claim 1, wherein the seam cover comprises a coating layer applied in place over the seam.

13. The pluggable module of claim 1, wherein the seam cover changes at least one physical characteristic after application to the first side wall.

14. The pluggable module of claim 13, wherein the seam cover hardens in place over the seam.

15. A pluggable module comprising:
a pluggable body extending between a front end and a mating end, the mating end being receivable in a module cavity of a receptacle assembly to mate with a communication connector, the pluggable body having a top, a bottom, a first side wall and a second side wall between the top and the bottom, the pluggable body having an upper shell defining the top and a lower shell defining the bottom, the upper shell being coupled to the lower shell at a seam, the upper shell having an upper pocket in the upper shell along the first side wall, the lower shell having a lower pocket in the lower shell along the first side wall aligned with the upper pocket;
a communication circuit board held in the pluggable body and exposed at the mating end, wherein the pluggable body is configured to be plugged into the receptacle assembly such that the communication circuit board is communicatively coupled to the communication connector of the receptacle assembly; and
a seam cover received in the upper pocket and the lower pocket and spanning across the seam between the upper shell and the lower shell on the first side wall, the seam cover being conductive and providing EMI shielding at the seam for the communication circuit board.

16. The pluggable module of claim 15, wherein the seam cover comprises a conductive tape spanning the seam.

17. The pluggable module of claim 15, wherein the seam cover includes an interior surface facing the pluggable body, the interior surface directly engaging the first side wall and being electrically connected to the first side wall.

18. The pluggable module of claim 15, wherein the seam cover includes an interior surface facing the pluggable body and an opposite exterior surface, the exterior surface being flush with or recessed inward of the first side wall.

19. A pluggable module comprising:
a pluggable body extending between a front end and a mating end, the mating end being receivable in a module cavity of a receptacle assembly to mate with a communication connector, the pluggable body having a top, a bottom, a first side wall and a second side wall between the top and the bottom, the pluggable body having an upper shell defining the top and a lower shell defining the bottom, the upper shell being coupled to the lower shell at a seam;
a communication circuit board held in the pluggable body and exposed at the mating end, wherein the pluggable body is configured to be plugged into the receptacle assembly such that the communication circuit board is communicatively coupled to the communication connector of the receptacle assembly; and
a seam cover coupled to the pluggable body at the first side wall covering the seam between the upper shell and the lower shell on the first side wall, the seam cover comprising a conductive tape having a conductive layer and an adhesive layer applied to the upper shell and the lower shell to span the seam, the conductive layer providing EMI shielding at the seam for the communication circuit board.

20. The pluggable module of claim 19, wherein the pluggable body includes a pocket in the first side wall, the seam cover being received in the pocket.

* * * * *